United States Patent [19]

Maxwell et al.

[11] Patent Number: 5,141,065
[45] Date of Patent: Aug. 25, 1992

[54] WEIGHT ACTIVATED PLATFORM SCALE

[75] Inventors: Charles E. Maxwell; David R. Gorman; Ronald D. Breding, all of Las Cruces, N. Mex.

[73] Assignee: Metro Corporation, Las Cruces, N. Mex.

[21] Appl. No.: 612,901

[22] Filed: Nov. 14, 1990

[51] Int. Cl.⁵ .............................. G01G 3/14
[52] U.S. Cl. ..................... 177/210 R; 177/DIG. 6
[58] Field of Search ............ 177/210 R, DIG. 6

[56] References Cited

U.S. PATENT DOCUMENTS

| 3,838,744 | 10/1974 | Tanji et al. | |
| 3,853,191 | 12/1974 | Yamagiwa | |
| 4,072,201 | 2/1978 | Wiesler | 177/DIG. 6 |
| 4,082,153 | 4/1978 | Provi | |
| 4,191,268 | 3/1980 | Miyoshi et al. | |
| 4,258,812 | 3/1981 | Pfeiffer | 177/DIG. 6 |
| 4,326,596 | 4/1982 | Beck | 177/DIG. 6 |
| 4,366,873 | 1/1983 | Levy et al. | 177/DIG. 6 |

FOREIGN PATENT DOCUMENTS 1586552 3/1981 United Kingdom .

Primary Examiner—George H. Miller, Jr.
Attorney, Agent, or Firm—Wood, Phillips, VanSanten, Hoffman & Ertel

[57] ABSTRACT

A pulse count scale includes a change of state detector circuit and an alert circuit which operate together with an electrical interrupter to detect when weight is applied on a scale platform and immediately connect power to a controller for a select interval. These circuits preserve battery power as well as providing simple operation, eliminating the requirement of actuating a separate switch prior to stepping onto the platform.

10 Claims, 3 Drawing Sheets

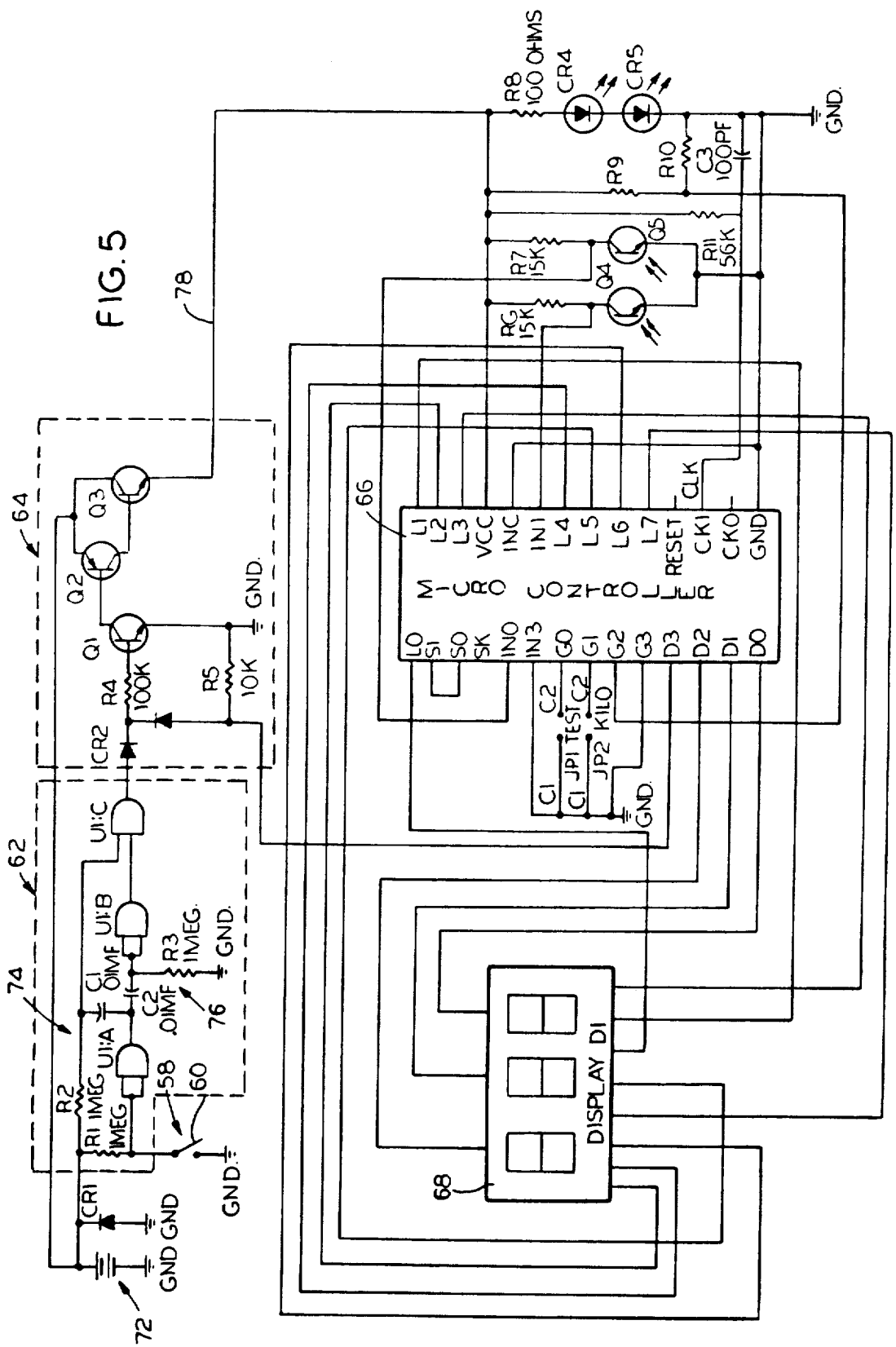

WEIGHT ACTIVATED PLATFORM SCALE

FIELD OF THE INVENTION

This invention relates to platform scales and, more particularly, to a weight activated control therefore.

BACKGROUND OF THE INVENTION

Various types of platform scales have been designed and manufactured by scale manufacturers. These scales include a conventional mechanical analog scale including a base and platform movable relative to the base. A lever structure is movable with the platform for causing rotation of a dial. Angular rotation of the dial represents weight on the platform which is indicated by numerical indicia on the dial visible through a window in the platform. An electronic-mechanical version replaces the dial display with a digital readout. The dial forms part of an electrical encoder. The encoder may take one of two known forms, namely a pulse count type which counts pulses representing angular movement, or the encoded type in which the dial is provided with a coded pattern. The coded pattern indicates angular position which is read by a sensor and converted to a measure of weight. Lastly, a strain gauge type scale includes a strain gauge for measuring pressure applied on the platform which is converted to an electrical signal applied to a digital readout.

With more recent technology different circuits have been utilized for turning on electronic or digital readout scales. If the scale is used continually the scale can be maintained on. With a domestic type bathroom scale it is desirable to maintain the scale energized only when in use. Particularly, if the scale is run on battery power, then it is desirable to minimize drainage on the battery. With bathroom type scales, the most widely used circuit includes a switch located on a side wall of the scale actuated by kicking it with a foot or pressing down on a lever with the foot. After the switch is actuated, an internal electrical circuit is energized and the display is reset to a zero value. Thereafter, the person can step on the scale and a weight is obtained and displayed. Due to the electro-mechanical design of the pulse count type scale, the scale must be turned on prior to weight being placed on the platform of the scale so that the zero reading may be obtained prior to commencing count of pulses. Particularly, once the sensor dial rotates from the slightest amount of weight being applied, pulse counting will begin. If this occurs before power is applied to the electronics, a wrong weight reading is obtained. Thus, a kick switch or the like can be used so that the sequence of events required for turning the scale on prevents a person from stepping onto the platform for power is turned on.

The present invention is intended to overcome one or more of the problems discussed above a novel and simple matter.

SUMMARY OF THE INVENTION

In accordance with the invention, there is disclosed a platform scale which is operable to turn the scale on immediately upon weight being applied to the platform.

More specifically, there is disclosed herein a pulse count type platform scale which turns on when stepped on in response to weight placed on the platform of the scale. The scale initially displays a zero reading and then provides a weight reading. Thus, the scale overcomes the disadvantages, shortcomings, and difficulties of the prior type scales.

It is a feature of the invention to provide a pulse count scale with no switch that requires a person to actuate prior to stepping onto the platform.

Further features and advantages of the invention will be readily be apparent from the specification and from the drawings.

BRIEF DESCRIPTION OF THE DRAWINGS

FIG. 5 is a detailed electrical schematic of the weight activated electrical control according to the invention.

DETAILED DESCRIPTION OF THE PREFERRED EMBODIMENT

Figure 1:
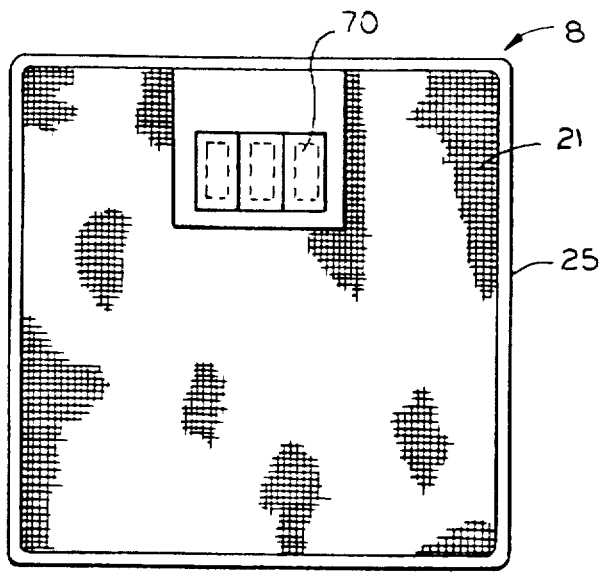
FIG. 1 is a top plan view of a bathroom type scale having the weight activation system according to the invention.
Figure 2:
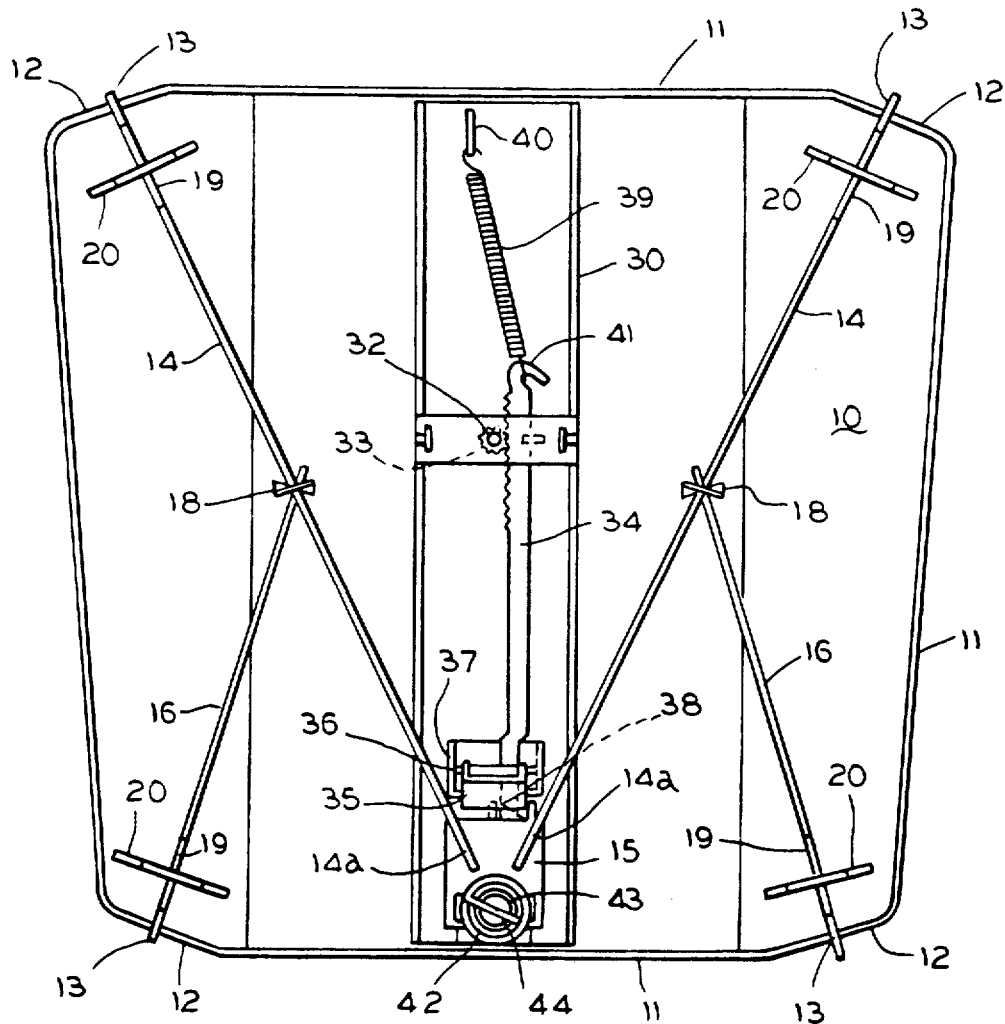
FIG. 2 is a top plan view of the bathroom type scale of FIG. 1 with the weight-receiving platform removed and showing the internal mechanical structure of the scale.

Referring now to the drawings and more particularly to FIGS. 1 and 2, there is shown a platform type bathroom scale 8 according to the invention. The scale 8 is provided with a base 10 formed as a stamped sheet metal member having an integral upstanding peripheral rim 11 turned at corners 12. The shape of the base 10 may be chosen to make any particular scale design and is generally rectangular in the illustrated form. The sheet metal base 10 is adapted to rest directly upon a floor or floor covering and support the mechanism of the scale therein. The mechanism support takes the form of upright slots 13 located in the four corners 12.

The weight sensing mechanism of the scale consists of a pair of primary levers 14 and a pair of secondary levers 16 arranged in interconnected fashion and resting upon the upright slots 13. The pair of primary levers 14 are joined to a common calibrating member or plate 15 adjacent one side of the base and diverged therefrom toward opposite adjacent corners of the base 10 and supported in the slots 13. The primary levers are each arranged on edge relative to the base and have an inverted V-notch (not shown) across the thickness of the lever material to rest upon the slots 13 at the rear of the base 10.

The secondary levers 16 have inverted V-notch portions (not shown) which rest upon the slots 13 in the front of the base 10. The other end of each of the secondary levers 16 is connected to and hangs below a primary lever 14 intermediate its ends by means of a bracket 18. Each of the primary and secondary levers 14 and 16 has a V-portion 19 located adjacent to the corner portion which supports the levers and is adapted to support the knife edged metal hangers 20 which rest in the V-portion of each respective lever.

A platform 21 is secured to the metal hangers 20 supported on the weight-receiving levers as discussed above. The depending hangers 20 are attached to the platform 21 by any known means. The platform has a depending side wall 25 at its periphery which extends over the base side wall 11 hiding most of it from view.

The platform 21 provides a weight-receiving surface upon which a person may stand. The weight is transferred by the metal hangers 20 to the levers 14 and 16 causing the levers and calibrating plate 15 to move toward the base.

The weight-sensing mechanism is mounted on a channel support 30 secured to the base 10 at a position generally centrally located on the base 10. The mechanism includes a rotary dial 27, see FIG. 3, turned by shaft 32 which is part of and rotated by a pinion gear 33. The pinion gear 33 is turned by a substantially horizontally extending rack 34 which is pivotally secured to a bell crank lever 35. The bell crank lever 35 comprises a generally U-shaped bracket pivotally supported on a rod 36 extending transversely through the bell crank sides and pivotally journalled in a support member 37. The rack 34 is pivotally connected at 38 to a lower end of the bell crank 35 to move with movement of the bell crank 35 and is held in engagement with pinion gear 33 by means of a spring 39 connected at 40 to the channel support 30 and connected at 41 to the rack 34.

The weight-receiving levers 14 and 16 are accurately counterbalanced by and attached to the calibrating plate 15. The front portions 14a of the primary levers are firmly secured to the calibrating plate 15 with teeth (not shown). A coil detention spring 42 is mounted upon a swivel post 43 which is loose and capable of moving on the bottom coils of the spring 42 threadably support the calibrating plate 15. The swivel post 43 has a slot 44 across its upper end for receiving and supporting top end of the coil spring 42.

Figure 3:
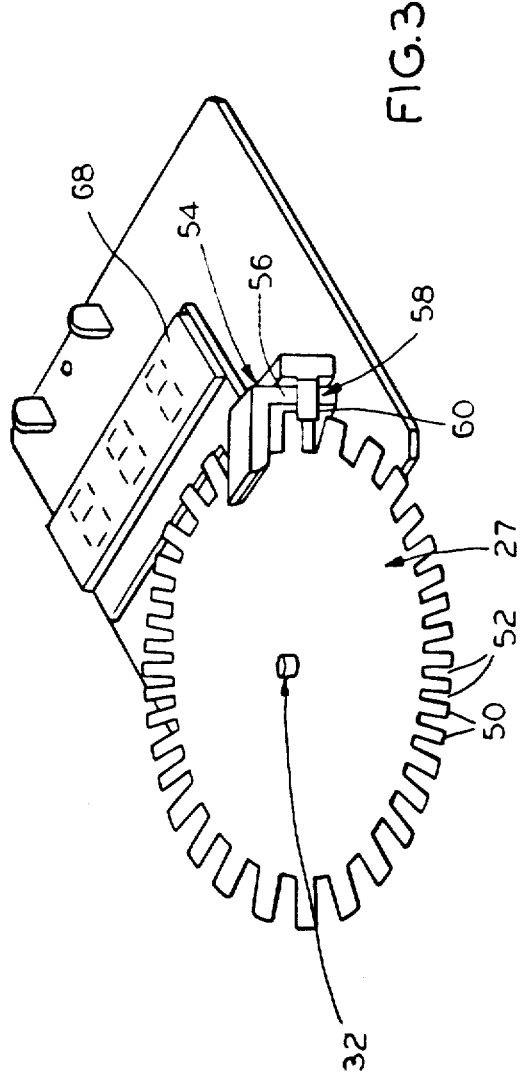
FIG. 3 is a perspective view of the encoder structure of the scale of FIG. 1.

With reference to FIG. 3, the dial 27 comprises a circular encoder disc formed of a conductive material. The disc includes a plurality of circumferentially spaced radially extending tabs 50 defining slots 52 therebetween. An optical interrupter 54 includes two photosensing elements for sensing rotary movement of the dial 27 generating pulse signals responsive thereto. The optical interrupter 54 includes a support 56 carrying the photosensitive elements discussed below. An electrical interrupter 58 is also mounted to the support 56. The electrical interrupter 58 comprises a wiper blade or strip 60 of conductive material mounted to the support 56 and positioned in the path of movement of the tabs 27. The blade 60 brushes the tabs 50 as the dial 27 rotates.

The electrical interrupter 58 operates as a switch with the wiper 60 forming a contact element which is either in contact with one of the tabs 50 or disposed in one of the slots 52. Particularly, if the blade 60 is in contact with a tab 50 then the electrical interrupter 58 is in a closed state. Conversely, if the wiper blade 60 rests within a slot 52, than the electrical interrupter is in an open state and there is no circuit path between the blade 60 and the dial 27.

Figure 4:
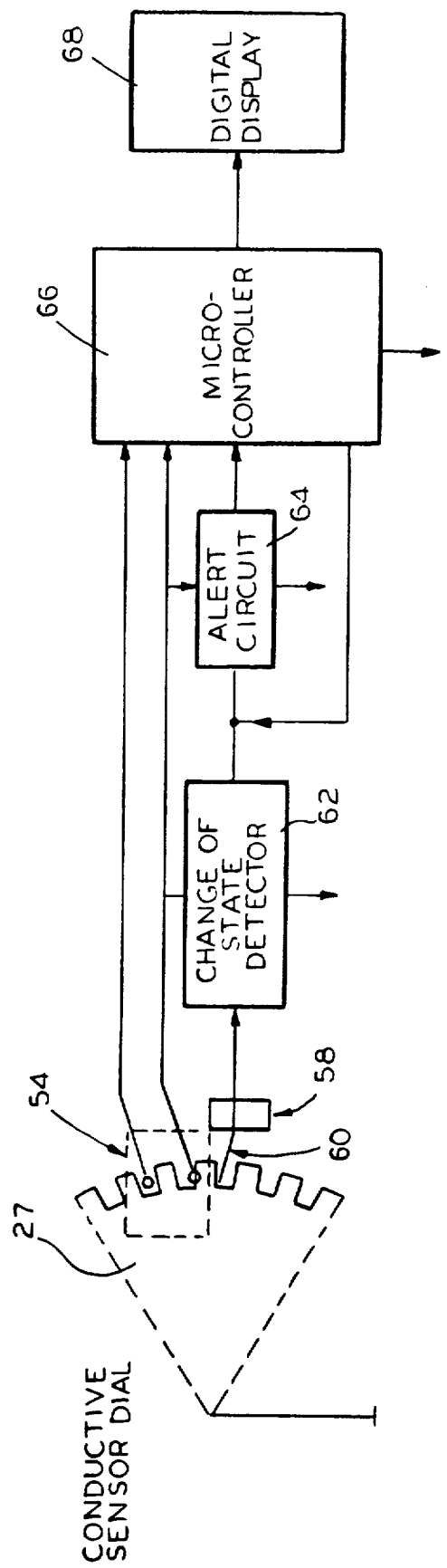
FIG. 4 is a generalized illustration-block diagram of a weight activated control according to the invention.

With reference to FIG. 4, the dial 27 is connected to ground via the shaft 32 which provides a chassis ground. A printed circuit board ground is also connected to the chassis ground. The electrical interrupter 58 is connected to a change of state detector 62 which has an output connected to an alert circuit 64. The output of the alert circuit 64 is connected to a microcontroller 66 which also includes a feedback to the alert circuit 64. The microcontroller 66 is connected to the optical interrupter 54 for receiving pulse signals therefrom. The microcontroller counts pulses received from the optical interrupter 54 in a conventional manner and derives a weight measurement provided to a digital display 68 which is visible through a window 70 in the platform 21, see FIG. 1.

With reference to FIG. 5, a schematic diagram for the scale is illustrated. In the illustrated embodiment of the invention power to the scale is provided by a battery 72, such as, for example, a 9 volt battery. A diode CR1 is connected across the battery 72 to provide reverse polarity protection. The battery 72 is also connected to the change of state circuit 62 and the alert circuit 64.

The change of state circuit 62 comprises a first NAND gate U1:A having both inputs connected to the electrical interrupter 58, specifically to the wiper 60. The inputs are also connected via a resistor R1 to the battery 72. A first timing circuit 74 comprising a capacitor C1 and a resistor R2 are connected between the battery 72 and an output of the first NAND gate U1:A. The output of the first NAND gate U1:A is connected through a capacitor C2 to both inputs of a second NAND gate U1:B. A resistor R3 is connected between ground and both inputs of the second NAND gate U1:B. The resistor R3 forms a second timing circuit 66 with the capacitor C2. The output of the second NAND gate U1:B is connected to one input of a third NAND gate U1:C. Another input of the third NAND gate U1:C is connected to the junction between the resistor R2 and the capacitor C1.

The alert circuit 64 includes a diode CR2 which connects the output of the change of state circuit third NAND gate U1:C, through to a resistor R4, to the base of a transistor Q1. The emitter of the transistor Q1 is connected to ground, while the collector is connected to the base of a second transistor Q2. The second transistor Q2 has its emitter connected to the battery 72 and its collector connected to the base of a third transistor Q3. The collector of the third transistor Q3 is connected to the battery 72. The emitter of the third transistor Q3 is connected to a line 78 which comprises VCC power to the microcontroller 66. Particularly, in accordance with the invention, power on the line 78 is enabled immediately upon weight being applied to the platform 21 and then only for a select time interval.

The microcontroller 66 may comprise, for example, an ETL9444 controller chip receiving power at a terminal 11 from the line 78. The optical interrupter 54 comprises a pair of LED's CR4 and CR5 connected to the line 78 via a resistor R8 and to ground. A pair of phototransistors Q4 and Q5 are associated with the respective LED's CR4 and CR5 for generating pulse signals to separate input ports IN1 and IN0 of the microcontroller 66. The display 68 is connected to output ports D0-D2 and L0-L7. An output port D3 is connected via a diode CR3 to a junction between the diode CR2 and the resistor R4 of the alert circuit 64.

Under normal operation, ignoring the change of state circuit 62 and alert circuit 64, with power on the line 78, rotation of the dial 27 causes a series of pulses to be generated by the phototransistors Q4 and Q5. Each pulse represents an increment of rotational movement of the dial 27. Two transistors are used to allow sensing of bidirectional rotational movement. The microcontroller 66 is configured with suitable counter functions for counting the number of pulses received and displaying a total weight indicative of the number of such pulses on the display 68, as is well known.

In accordance with the invention, the electrical interrupter 58, change of state circuit 62 and alert circuit 64 are operable to provide electrical power to the microcontroller 66 from the battery 72 for limited time intervals after weight is applied to the platform 21.

Initially, with no weight on the scale 8, the transistor Q3, via the transistors Q1 and Q2 is turned off so that no voltage is present on the line 78. Thus, no power is applied to the microcontroller 66 or display 68, preserving battery power. Once weight is applied to the platform 21 it is necessary that the controller 66 be turned on quickly enough to sense all pulses generated by the phototransistors Q4 and Q5.

The change of state detector 62 is operable to detect the first change of state of the electrical interrupter 58. The change of state may occur from an open condition to a closed condition, or vice versa. This corresponds to the rest position of the blade 60 being on a tab 50 or in a slot 52. As weight is applied to the platform 21, the dial 27 rotates. The blade 60 brushes across the moving tabs making contact with circuit ground. This produces a series of pulses, in the form of contact to circuit ground. The change of state detector circuit 62 operates by first conditioning the signal from the interrupter 58 using the first NAND gate U1:A so the change in state of the contact 60 produces a predictable and repeatable rate of change monitored by the second and third NAND gates U1:B and U1:C. The third NAND gate U1:C produces a positive output pulse signal upon detecting a change in state of the electrical interrupter 58. The timing circuits 74 and 76 control the duration of the output pulse as well as the sensitivity changes in state of the electrical interrupter 58.

The first pulse transmitted from the third NAND gate U1:C to the alert circuit 64 sequentially turns on the three transistors Q1-Q3. As soon as the third transistor Q3 is turned on the line 78 is connected to the battery 72 to provide power to the microcontroller 66. Immediately upon becoming energized, the D3 output from the microcontroller 66 assumes a high state to the base of the transistor Q1 so that all subsequent pulses from the change of state detector are ignored. As such, a latch or hold circuit is provided which maintains the alert circuit 64 in an on condition so that power is maintained to the microcontroller 66 even after movement of the dial 27 ceases.

Immediately upon becoming energized, the microcontroller 66 resets and outputs a zero value. Since the LED's CR4 and CR5 are tied to the optical interrupter 54 begins operating immediately to count pulses. The reaction time between the electrical interrupter 58 changing state and applying power to the microcontroller 66 is on the order of 1-2 milliseconds. As a result, the power is applied virtually instantaneously to the microcontroller 66 so that no pulses sensed by the optical interrupter 54 are missed.

The microcontroller 66 includes an internal programmed timer which automatically disables the output D3 after a select interval of time. This time might be on the order of, for example, 20-30 seconds to allow sufficient time for a weight to be read on the display 68 and the user to step off the platform 21. With the output D3 disabled and the absence of any pulses from the change of state detector 74, the alert circuit 64 is turned off as by turning off the transistors Q1-Q3 to disconnect the line 78 from the battery 72.

Thus, the scale 8 includes a change of state detector circuit 62 and alert circuit 64 which operate together with the electrical interrupter 58 to detect when weight is applied on the platform 21 and immediately connect power to the controller 66 for a select interval. This circuit preserves battery power as well as providing simple operation, eliminating the requirement of actuating a separate switch prior to stepping onto the platform 21.

The illustrated embodiment to the invention is illustrative of the broad inventive concepts comprehended hereby.

We claim:

1. A platform scale comprising:
   a scale base;
   weight sensing apparatus supported on said base including a weight supporting platform movable relative to said base and a weight sensing mechanism responsive to movement of said platform for rotating a shaft;
   a rotary dial connected to said shaft for rotation therewith and including indicia representing rotational position of said dial and thus weight on said platform;
   a first sensor operatively positioned relative to said dial for sensing said indicia;
   an electrically operable control connected to said sensor for determining weight on said platform responsive to sensed position of said dial and including an electronic display means providing a digital readout of such weight on said platform; and
   a power circuit providing electrical power to said control from a power source for limited intervals, including a second sensor operatively positioned relative to said dial for sensing movement of said dial and exhibiting a varying electrical condition responsive thereto, and a detecting circuit electrically connected to said second sensor for connecting the power source to said control for a select interval after detecting a variation in the electrical condition of said second sensor.

2. The platform scale of claim 1 wherein said dial comprises a disk including a plurality of circumferentially spaced slots about its periphery and said first sensor comprises an optical sensor for sensing presence or absence of a slot disposed proximate thereof.

3. The platform scale of claim 1 wherein said dial comprises a conductive disk including a plurality of circumferentially spaced radially extending tabs about its periphery and said second sensor comprises a conductive wiper disposed in a path of said tabs to define a switch providing an closed or open state in response to presence or absence of one of the tabs contacting said wiper.

4. The platform scale of claim 3 wherein said detecting circuit connects the power source to said control immediately upon detecting any change in state of said switch.

5. The platform scale of claim 3 wherein said detecting circuit includes a change of state circuit developing a pulse signal responsive to movement of said dial and an alert circuit driven by said pulse signal for connecting the power source to said control upon receiving a pulse.

6. The platform scale of claim 5 wherein said control generates a feedback signal to said alert circuit for the select interval after connection to the power source, said feedback signal overriding said pulse signal to maintain connection from the power source to said control only for the select interval.

7. In a weigh scale including a scale base, weight sensing apparatus supported on said base including a weight supporting platform movable relative to said base and a weight sensing mechanism responsive to movement of said platform for rotating a dial movable an angular amount representing weight on said platform, and a pulse generator generating a series of pulses responsive to movement of said dial, a weight activated electrical display control comprising:
- an electrically operable control connected to said pulse generator for determining weight on said platform responsive to the number of pulses received therefrom and including an electronic display means providing a digital readout of weight on said platform;
- an electrical switch including a contact which changes state in response to any change in weight on said platform sufficient to cause angular movement of said dial an amount so that said pulse generator generates a pulse; and
- a power circuit providing electrical power to said electrically operable control from a power source for limited intervals including a detecting circuit electrically connected to said switch for connecting the power source to said electrically operable control for a select interval immediately after detecting a change in state of said switch.

8. In a weigh scale including a scale base, weight sensing apparatus supported on said base including a weight supporting platform movable relative to said base and a weight sensing mechanism responsive to movement of said platform for rotating a dial movable an angular amount representing weight on said platform, and a pulse generator generating a series of pulses responsive to movement of said dial, a weight activated electrical display control comprising:
- an electrically operable control connected to said pulse generator for determining weight on said platform responsive to the number of pulses received therefrom and including an electronic display means providing a digital readout of weight on said platform;
- an electrical switch including a contact which changes state in response to change in weight on said platform, wherein said dial comprises a conductive disk including a plurality of circumferentially spaced radially extending tabs about its periphery and said switch contact comprises a conductive wiper disposed in a path of said tabs to define a closed state only in response to one of the tabs contacting said wiper; and
- a power circuit providing electrical power to said control from a power source for limited intervals including a detecting circuit electrically connected to said switch for connecting the power source to said control for a select interval immediately after detecting a change in state of said switch.

9. The weight activated electrical display control of claim 8 wherein said detecting circuit includes a change of state circuit developing a pulse signal responsive to change of state of said switch and an alert circuit driven by said pulse signal for connecting the power source to said control upon receiving a pulse.

10. The weight activated electrical display control of claim 9 wherein said control generates a feedback signal to said alert circuit for the select interval after connection to the power source, said feedback signal overriding said pulse signal to maintain connection from the power source to said control only for the select interval.

* * * * *